(No Model.)
M. N. SEVIER.
SCALE BEAM.
No. 490,507. Patented Jan. 24, 1893.
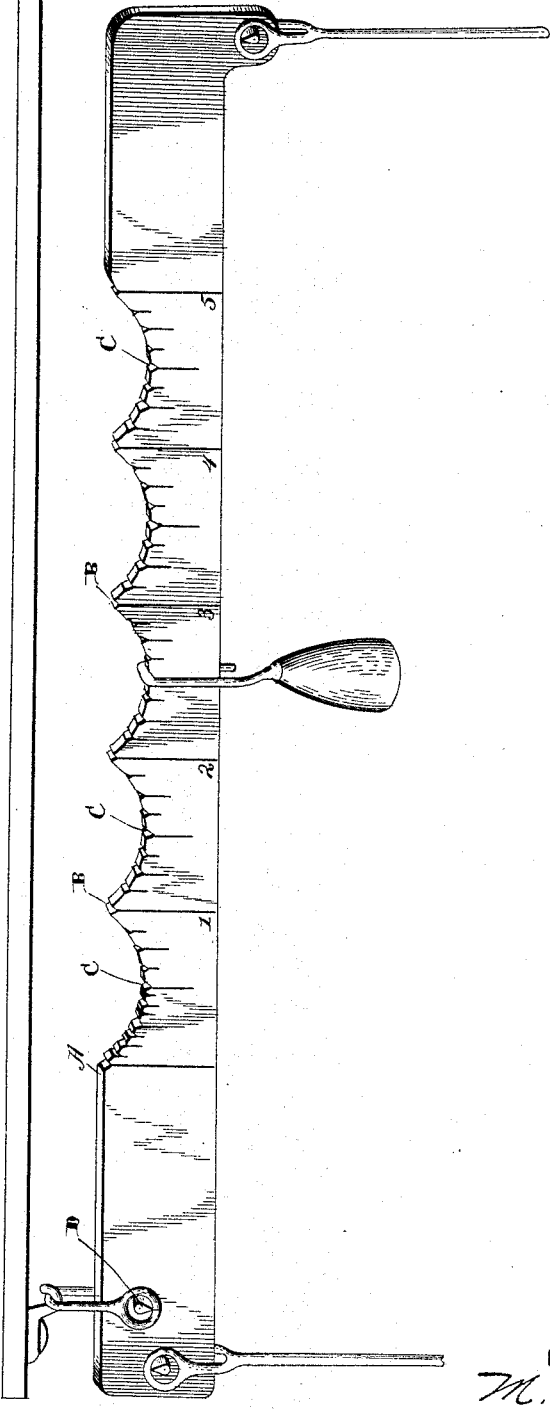
Witnesses—
Geo. E. Frick
Rol. A. Fitzgerald
Inventor—
M. N. Sevier
By Lehmann Patterson & Wright
Attys

UNITED STATES PATENT OFFICE.

MOSES NIMROD SEVIER, OF VERNON, TEXAS.

SCALE-BEAM.

SPECIFICATION forming part of Letters Patent No. 490,507, dated January 24, 1893.

Application filed August 29, 1892. Serial No. 444,412. (No model.)

*To all whom it may concern:*

Be it known that I, MOSES NIMROD SEVIER, of Vernon, in the county of Wilbarger and State of Texas, have invented certain new and useful Improvements in Scale-Beams; and I do hereby declare the following to be a full, clear, and exact description of the invention, such as will enable others skilled in the art to which it pertains to make and use it, reference being had to the accompanying drawing, which forms part of this specification.

My invention relates to an improvement in scale beams: and it consists in forming the weight notches on the upper edge of the beam at different heights for the purpose fully described hereinafter and more particularly referred to in the claims.

The object of my invention is to provide a beam upon which the weight may be adjusted and the point of adjustment ascertained as well in the dark as in the light, thus making it possible for even a blind man to weigh articles with accuracy.

The accompanying drawing is a perspective view of my improved beam.

The improved device which forms the subject matter of this application may be used in connection with any beam scale and therefore the scale is not shown as it forms no part of my invention.

The upper edge of the beam A, is formed into a series of projections or enlargements which have diverging downwardly sloping edges which form concavities or scallops as shown. At the tops of these enlargements are formed the pound notches B, and at the lower ends of the inclined sides of the projections or rather at the bottoms of the concavities or scallops are formed the half pound notches C. On the inclines O—F the enlargements or projections are formed the four and two ounce notches representing respectively the quarter and eighth pounds. The portion of the first scallop nearest the fulcrum point D, of the beam is formed with a notch for each ounce up to the half pound point C. Thus the operator is enabled to weigh any number of ounces less than the half pound or even one ounce if so desired.

It will be readily understood that in moving the weight along on the beam its position thereon is readily ascertained by noting its situation relative to the projections, whether being located thereon, or at their bases, or on their sloping sides. By simply counting the number of projections from the end of the beam the number of pounds may be readily ascertained as each projection counts a pound. The scale is easily operated in the dark or by a person deprived of sight, with rapidity and accuracy.

I do not wish to limit myself to the exact mode herein described and shown of marking off the enlargement or projections as the half pounds may be placed at the upper ends of the projections, or the several points reversed or their positions changed without departing from the spirit of my invention.

Having thus described my invention, I claim

1. A scale beam having a series of indicating projections upon its upper edge forming depressions between them and a series of indicating marks in each depression, substantially as described.

2. A scale beam having a series of projections upon its upper edge forming depressions between them, and a series of notches formed in the upper edge of each depression, substantially as described.

3. A scale beam having a series of projections forming scallops, and indicating or weighing points at different elevations on the same, substantially as shown and described.

4. A scale beam having a series of projections on its upper edge having sides which diverge downward from their upper ends, and weighing points or notches formed at intervals on the said sloping sides, substantially as shown and described.

5. A scale beam having a series of projections on its upper edge which are formed with sides which diverge downward from their upper ends forming scallops between the projections, and notches formed at the upper ends of the projections; at their bases, and between their upper ends and bases, substantially as shown and described.

In testimony whereof I affix my signature in presence of two witnesses.

MOSES NIMROD SEVIER.

Witnesses:
J. G. HUMPHREYS,
F. C. RATCLIFF.